Figure 1:
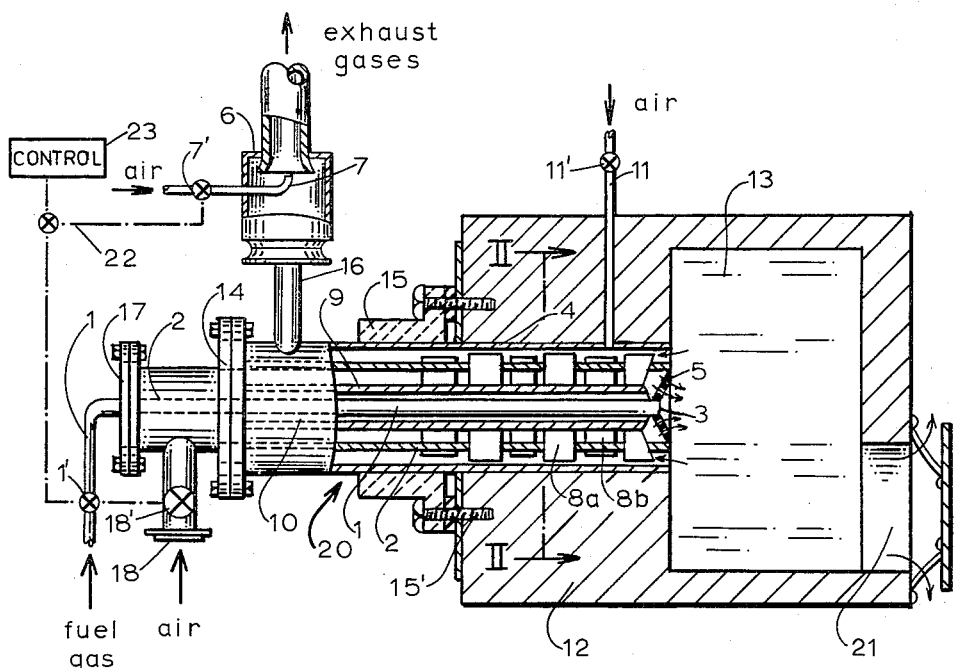

Dec. 29, 1964  T. SCHMIDT ETAL  3,163,202
BURNER FOR INDUSTRIAL FURNACES AND THE LIKE
Filed July 13, 1961

WALTER LITTERSCHEIDT
THEODOR SCHMIDT
*INVENTOR.*

BY

AGENT

United States Patent Office 3,163,202
Patented Dec. 29, 1964

3,163,202
BURNER FOR INDUSTRIAL FURNACES
AND THE LIKE
Theodor Schmidt, Essen, and Walter Litterscheidt, Kettwig (Ruhr), Germany, assignors to Indugas, Gesellschaft für industrielle Gasverwendung m.b.H., Essen, Germany, a corporation of Germany
Filed July 13, 1961, Ser. No. 123,883
Claims priority, application Germany, July 19, 1960, J 18,460
3 Claims. (Cl. 158—7.5)

Our present invention relates to burners for industrial furnaces and other heating appliances in which the heat of the exhaust gases is utilized for preheating the oxidizing agent and possibly also the fuel fed into the burner.

It is an object of our present invention to provide a burner of improved fuel economy having means for assuring maximum utilization of the heat of recovered exhaust gases for preheating the interacting fluids fed into the burner, thereby minimizing the loss of thermal energy available from the fuel used.

It is a further object of our invention to improve the efficiency of combustion by providing a burner which assists in the removal of the spent exhaust gases, and this to a degree corresponding to the amount of exhaust gases created.

It is another object of this invention to provide an improved burner of compact and relatively simple design, suitable for installation in various types of furnaces and other heating appliances.

According to an important feature of the invention, an industrial burner of the open-mouth type is directly combined with a heat exchanger into a compact unit having closely juxtaposed conduits for the passage of combustion-sustaining agents and hot exhaust gases in counterflow. The burner according to our invention preferably comprises a nest of coaxial tubes including a central tube for applying the fuel stream proper, e.g. illuminating gas, an intermediate tube carrying an oxygen-containing fluid, such as air, and an outer tube for the return of the exhaust gases, all three tubes opening at a common location (hereinafter referred to as the burner mouth) into the combustion chamber of a furnace or other installation served thereby. For optimum heat transfer the coaxial tubes, or at least the outer two of them, are advantageously interconnected by plates or fins of high thermal conductivity traversing the common tube wall while lying, preferably, in radial planes; at least the major part of the heat exchanger so constituted may be accommodated in the wall of the combustion chamber to minimize heat losses by outward radiation.

Another feature of our invention resides in the provision of means remote from the burner mouth, such as a jet pump located at the outer end of the exhaust-gas tube, for drawing the hot smoke from the combustion chamber outwardly through the heat exchanger at a rate preferably commensurate with the rate of admission of fuel and oxidizing gases into the chamber. This equilibrium of input and outflow makes the operation of our improved burner substantially independent of any convection currents prevailing within the combustion chamber and allows the burner to be used with chambers which are either completely sealed or partly open toward the ambient air.

In some instances, e.g. with furnaces operating with a reducing atmosphere, the returning exhaust gases may still carry a considerable proportion of combustible components. In these systems the heat exchanger according to our invention may advantageously be provided with auxiliary oxygen-supply means leading into the exhaust-gas tube near the burner mouth for completing the burning process, thereby delivering additional heat to the incoming working fluids.

Figure 2:
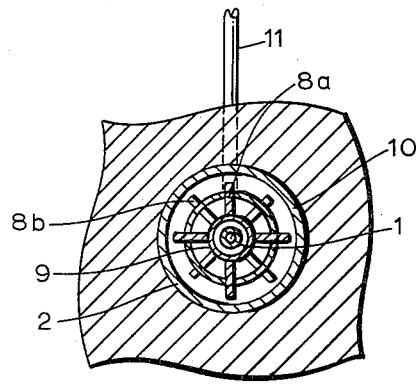

The invention will be better understood from the following detailed description given in accordance with an accompanying drawing in which:

FIG. 1 is a cross-sectional side view of an industrial burner according to the present invention; and FIG. 2 is an enlarged cross-sectional view of the burner taken along line II—II of FIG. 1.

As shown in the accompanying drawing, a fuel-gas tube 1 partly enclosed in a heat-conductive sheath 9, an air tube 2 and an exhaust-gas tube 10 are coaxially nested in one another, tubes 1 and 10 forming respectively the core and the external cylindrical wall of an industrial burner 20 passing through an opening in a wall 12 of a furnace chamber 13. The burner 20 is open toward the chamber 13, the tubes 1 and 2 terminating at a burner mouth defined by a perforated conical shield 3 through which the working fluids from these tubes enter the furnace. The exhaust tube 10 forms an annular opening 5 around the shield 3 for the removal of combustion gases from the furnace chamber. The other ends of the exhaust and air tubes 10, 2 are respectively closed by fittings 14 and 17. The burner 20 is supported in a sleeve 15 of thermally insulating material which is firmly connected to wall 12 by suitable means such as bolts 15'. Air enters the tube 2 through a nipple 18, a similar nipple 16 serving to lead the exhaust gases from tube 10 into a jet pump 6 provided with an air nozzle 7. The exhaust tube 10 further communicates in the vicinity of its opening 5 with an additional air pipe 11 controlled by a valve 11'. Thermally conductive fins 8a, 8b protrude from the sheath 9 at axially spaced and angularly staggered locations, traverse the tube 2 and extend partly into the interior of tube 10 thus forming a section 4 of intensive heat exchange located almost entirely in wall 12. Chamber 13 is shown provided with a vent 21 remote from burner 20.

The operation of the industrial burner according to our invention shown in the drawing is as follows:

Gas and air are fed into the burner 20 via the tubes 1 and 2 to mingle at the shield 3 where the resulting mixture is ignited by conventional means to form a flame which heats the furnace chamber 13. Hot exhaust gases from inside the furnace are drawn through the opening 5 into the exhaust tube 10 by the suction created at the jet pump 6; additional air may be supplied through pipe 11 so that any unburned fuel components remaining in the exhaust gases can be fully oxidized. The exhaust gases heat the fins 8a, 8b which transmit the heat to the interior of tube 2 and to the sheath 9 closely surrounding tube 1, thereby effectively preheating the working fluid streaming through these tubes toward the burner mouth at shield 3. The spent exhaust gases pass through the nipple 16 and the jet pump 6 into the atmosphere.

The intensity of the suction created by the jet pump 6 depends upon the rate of air discharge from nozzle 7. This rate can be co-ordinated with the rate of fuel and air passage through tubes 1 and 2, respectively, by means of valves 1', 7' and 18' which are respectively provided in pipe 1, nozzle 7 and nipple 18 and are adjustable via a linkage 22 by manual or automatic means, the latter being here shown as a control device 23 which may include a conventional thermostat for regulating the amount of heat delivered to the furnace. A desired balance between the inflow and the outflow of gases at the burner mouth can be established by a suitable relative adjustment of these valves, due consideration being given to the admission of supplemental air, if any, through pipe 11 under the control of valve 11'.

Our invention is, of course, not limited to the specific embodiments described and illustrated but may be realized

We claim:
1. In a heating system, the combination with a combustion chamber provided with a wall of a burner traversing said wall and having a mouth opening into said chamber substantially at said wall, said burner comprising a set of coaxially nested tubes including a central tube for the admission of a fuel gas into said chamber, an intermediate tube for the admission of an oxygen-containing gas into said chamber and an outer tube for the removal of exhaust gases from said chamber, all of said tubes terminating at said mouth, suction means connected with said outer tube at a location remote from said mouth and said chamber for drawing said exhaust gases therethrough, and thermally conductive means in at least said outer and intermediate tubes for facilitating heat exchange between said outer and said central and intermediate tubes, thereby effectively preheating said fuel and oxygen-containing gases by the heat of said exhaust gases, said thermally conductive means comprising a set of fins passing through the interior of said intermediate tube and extending into said outer tube, and a tubular heat-conductive sheath coaxially surrounding said central tube over at least a major part of its length with peripheral clearance, said fins projecting outwardly from said sheath in heat-conducting relationship therewith.

2. In a heating system, the combination with a combustion chamber provided with a wall, of a burner traversing said wall and having a mouth opening into said chamber substantially at said wall, said burner comprising a set of coaxially nested tubes including a central tube for the admission of a fuel gas into said chamber, an intermediate tube for the admission of an oxygen-containing gas into said chamber and an outer tube for the removal of exhaust gases from said chamber, all of said tubes terminating at said mouth, suction means connected with said outer tube at a location remote from said mouth and said chamber and for drawing said exhaust gases therethrough, means for supplying supplemental oxygen to said outer tube communicating therewith within said wall for burning combustible portions of said exhaust gas in said outer tube, and thermally conductive means in at least said outer and intermediate tubes for facilitating heat exchange between said outer and said central and intermediate tubes, thereby effectively preheating said fuel and oxygen-containing gases by the heat of said exhaust gases, said thermally conductive means comprising a set of fins passing through the interior of said intermediate tube and extending into said outer tube, and a tubular heat-conductive sheath coaxially surrounding said central tube with peripheral clearance over at least a major part of its length, said fins projecting outwardly from said sheath in heat-conducting relationship therewith.

3. In a heating system, the combination with a combustion chamber provided with a wall of a burner traversing said wall and having a mouth opening into said chamber substantially at said wall, said burner comprising a set of coaxially nested tubes including a central tube for the axial admission of a stream of fuel gas into said chamber, an intermediate tube for the admission of an oxygen-containing gas into said chamber and an outer tube for the removal of exhaust gases from said chamber, all of said tubes terminating at said mouth; outlet means at said mouth for directing said oxygen-containing gas toward the axis of said tubes and said stream of fuel gas; suction means connected with said outer tube at a location remote from said mouth for drawing said exhaust gases therethrough, and thermally conductive means in at least said outer and intermediate tubes for facilitating heat exchange between said outer and said central and intermediate tubes, thereby effectively preheating said fuel and oxygen-containing gases by the heat of said exhaust gases, said thermally conductive means comprising a set of fins passing through the interior of said intermediate tube and extending into said outer tube, and a tubular heat-conductive sheath coaxially surrounding said central tube with peripheral clearance over at least a major part of its length, said fins projecting outwardly from said sheath in heat-conducting relationship therewith.

References Cited in the file of this patent

UNITED STATES PATENTS

| | | |
|---|---|---|
| 792,642 | Williams | June 20, 1905 |
| 813,918 | Schmitz | Feb. 27, 1906 |
| 871,070 | Schwartz | Nov. 12, 1907 |
| 2,255,540 | Dreffein | Sept. 9, 1941 |
| 2,322,341 | Booth | June 22, 1943 |
| 2,391,447 | Edge | Dec. 25, 1945 |
| 2,547,735 | Blaha | Apr. 3, 1951 |
| 2,567,485 | Jenny | Sept. 11, 1951 |
| 2,991,832 | Dailey | July 11, 1961 |
| 2,992,676 | Henwood | July 18, 1961 |

FOREIGN PATENTS

| | | |
|---|---|---|
| 1,044,190 | France | June 17, 1953 |